(12) United States Patent
Stieger et al.

(10) Patent No.: US 9,452,866 B2
(45) Date of Patent: Sep. 27, 2016

(54) CUP SUPPORT AND DISPENSING DEVICE

(71) Applicant: NESTEC S.A., Vevey (CH)

(72) Inventors: Michael (Mischa) Stieger, Orbe (CH); Yann Brunner, Nuvilly (CH)

(73) Assignee: Nestec S.A., Vevey (CH)

( * ) Notice: Subject to any disclaimer, the term of this patent is extended or adjusted under 35 U.S.C. 154(b) by 280 days.

(21) Appl. No.: 14/346,190

(22) PCT Filed: Sep. 19, 2012

(86) PCT No.: PCT/EP2012/068460
§ 371 (c)(1),
(2) Date: Mar. 20, 2014

(87) PCT Pub. No.: WO2013/041580
PCT Pub. Date: Mar. 28, 2013

(65) Prior Publication Data
US 2014/0251494 A1 Sep. 11, 2014

(30) Foreign Application Priority Data
Sep. 22, 2011 (EP) ..................................... 11182294

(51) Int. Cl.
*B65B 1/04* (2006.01)
*B65D 25/22* (2006.01)
(Continued)

(52) U.S. Cl.
CPC .............. *B65D 25/22* (2013.01); *A47J 31/401* (2013.01); *A47J 31/4403* (2013.01); *A47J 31/4425* (2013.01); *A47J 43/042* (2013.01); *B67D 7/84* (2013.01); *G07F 13/00* (2013.01); *A47G 23/03* (2013.01); *B67C 3/24* (2013.01)

(58) Field of Classification Search
CPC ......... B65D 25/22; A47G 23/03; B67C 3/24
USPC .................... 141/1, 253, 275, 277, 312, 369
See application file for complete search history.

(56) References Cited

U.S. PATENT DOCUMENTS 482,603 A * 9/1892 Weigel ................... A47G 23/03
248/346.11
937,850 A 10/1909 Parker
(Continued)

FOREIGN PATENT DOCUMENTS

CH 487636 5/1970
DE 8615604 4/1987
(Continued)

*Primary Examiner* — Jason K Niesz
(74) *Attorney, Agent, or Firm* — K&L Gates LLP

(57) ABSTRACT

The present invention discloses a cup support and a dispensing device that uses a cup support. The cup support is adapted to hold at least cups of two different diameters and sizes. The cup support and the dispensing device are adapted to detect the diameter and size of the cup, and enable that when a diluent jet is injected into the cup, the jet is oriented to impact onto a predetermined position on a sidewall of the cup. The orientation of the jet achieves an effective dissolution of food ingredient in the cup by the injected diluent. The dispensing device is designed to move the cup support in a horizontal and vertical direction, to rotate the cup support. The cup support is not directly actuated, but is fitted into movable and rotatable holding means, from which it can be easily dismantled to be cleaned. The cup support comprises a plug element comprising one protusion. The dispensing device comprises a motor for vertically moving the cup support or the injection means.

13 Claims, 7 Drawing Sheets

(51) Int. Cl.
  *A47J 31/44* (2006.01)
  *G07F 13/00* (2006.01)
  *A47J 31/40* (2006.01)
  *A47J 43/042* (2006.01)
  *B67D 7/84* (2010.01)
  *B67C 3/24* (2006.01)
  *A47G 23/03* (2006.01)

(56) References Cited

U.S. PATENT DOCUMENTS

| | | | |
|---|---|---|---|
| 2,601,312 A * | 6/1952 | McGrew | A47G 23/03 |
| | | | 248/346.11 |
| 3,620,155 A | 11/1971 | Bixby, Jr. | |
| 5,312,013 A | 5/1994 | Bridges | |
| 6,082,246 A | 7/2000 | Thorn et al. | |
| 6,102,352 A | 8/2000 | Kvalvog | |
| 6,302,291 B1 * | 10/2001 | McCleerey | B65D 25/22 |
| | | | 206/501 |
| 6,607,090 B1 | 8/2003 | Doerr | |
| 6,908,012 B1 | 6/2005 | Pfeifer | |
| 2005/0279689 A1 | 12/2005 | Oranski et al. | |
| 2006/0016820 A1 | 1/2006 | Himes et al. | |
| 2006/0117708 A1 * | 6/2006 | Thielmann | B65C 9/045 |
| | | | 53/281 |
| 2006/0283330 A1 | 12/2006 | Lin | |
| 2007/0266861 A1 | 11/2007 | Hart | |

FOREIGN PATENT DOCUMENTS

| | | |
|---|---|---|
| DE | 202005011476 | 10/2005 |
| DE | 202005018271 | 1/2006 |
| DE | 102008029835 | 12/2009 |
| DE | 102008042178 | 3/2010 |
| EP | 1647951 | 4/2006 |
| EP | 1656863 | 5/2006 |
| EP | 2070454 | 6/2009 |
| FR | 1290076 | 2/1962 |
| FR | 2932663 | 12/2009 |
| GB | 2449307 | 11/2008 |
| GB | 2474040 | 4/2011 |
| JP | 08115465 | 5/1996 |
| WO | 0172189 | 10/2001 |
| WO | 2006032596 | 3/2006 |
| WO | 2006053456 | 5/2006 |
| WO | 2011086088 | 7/2011 |

* cited by examiner

CUP SUPPORT AND DISPENSING DEVICE

CROSS REFERENCE TO RELATED APPLICATIONS

The present application is a National Stage of International Application No. PCT/EP2012/068460, filed on Sep. 19, 2012, which claims priority to European Patent Application No. 11182294.6, filed Sep. 22, 2011, the entire contents of which are being incorporated herein by reference.

The present invention is directed to a cup support for holding a cup, and to a dispensing device with a cup support. In particular, the cup support of the invention is of simple mechanical structure, can be easily dismantled from the dispensing device for cleaning purposes, and can hold suitable cups securely and in a way that the dispensing device can effectively dissolve a food ingredient in the cup.

Some state of the art dispensing devices mix a food ingredient, e.g. a soluble powder or liquid concentrate, with a diluent, e.g. water or milk, directly in a drinking cup instead of a mixing chamber. In such dispensing devices the food ingredients are usually first metered by a dosing device, and are then delivered to the drinking cup. If the dispensing device is capable of dispensing different kinds of beverages or liquid food mixtures, it can be adapted to move the drinking cup under the desired food ingredient container and then move the drinking cup to a dilution position where the diluent is injected into the drinking cup. For example in EP 1 088 504 A1, a drinking cup is placed on a cup support that moves the cup to at least one food ingredient container, and then moves the cup to a dilution position.

In order to achieve an excellent dissolution of the food ingredient, the diluent can be injected in the form of at least one diluent jet. For example EP 2 168 468 A1 discloses that a cup can be rotated during the injection of a diluent, in order to achieve an even more effective dissolution of the food ingredient. It has been shown that an effective dissolution of the food ingredient depends strongly on the impact position of diluent jets on the cup.

For the above dispensing devices it is further important that a cup support can be easily dismantled for cleaning, and that the cup support is itself easy to clean, preferably in a dish washer.

Such cup supports have been described for example in WO 2008/049223, EP 1 818 881, or US 2008/190948. However, the cup supports disclosed in the above-mentioned prior art documents present at least one of the following drawbacks:
- the cup supports are mechanically complex, and thus are costly to produce and difficult to clean.
- the cup supports do not enable movement of a cup in different directions, i.e. they only hold the cup.
- the cup supports hold the cup via its upper edge, which makes the dissolution of food ingredients with diluent jets too difficult to implement and control.
- the cup supports accept every type of cup regardless of its diameter, which makes it hard to align the diluent jets so that they impact onto specific areas of the walls of the cup.

The present invention aims at overcoming the above-mentioned drawbacks, and thus generally aims at improving the existing state of the art.

In particular, an aim of the present invention is to well support a cup in a cup support, so that it cannot fall out during its movement in a dispensing device.

A further aim of the present invention is to enable the use of differently sized drinking cups in connection with a single cup support (at least two supported cup sizes are desired).

A further aim of the present invention is to control the size of the cups that are used with the dispensing machine, since injection means for diluents jets are typically configured only for specific cup sizes. In particular, since the diluent jets must preferably impact the sidewall of the cups at a specific location.

A further aim of the present invention is to enable movement of a cup support in horizontal and vertical direction, and to enable rotation on itself.

A further aim of the present invention is to hold a cup in a way that it can be positioned appropriately in respect to diluent jets.

A further aim of the present invention is to design a cup support that can be easily dismantled from a dispensing device for cleaning purposes, and is itself easy to clean.

The present invention is therefore directed to a cup support for holding a cup in a dispensing device, the cup support comprising:
- a base,
- at least one outer support structure on an outer periphery of the base,
- at least one inner support structure arranged on a first surface of the base within the outer periphery of the base, wherein at least one cup holding space is formed between an inner sidewall of the at least one outer support structure and an outer sidewall of the at least one inner support structure.

The cup support is of simple mechanical structure. Due to the cup holding space, a cup can be held securely. At least two different cup sizes can be held by the cup support, namely one cup size, for which a cup is retained by leaning on the inner sidewall of the at least one outer support structure, and another cup size, for which a cup is retained by leaning on the outer sidewall of the at least one inner support structure. The cup support can further be manufactured from a single piece, which significantly reduces its production costs, and can be made of a material, which is easy to clean, like a dish washer resistant plastic. The cup support could further be provided with a layer that rejects dirt and/or liquids. The cup support is adapted to hold cups from the bottom, in particular when a specifically suited cup is used. Such a cup has preferably a circumferential flange at its bottom. Preferably, the at least one outer support structure is a ring-shaped wall surrounding the base. The ring-shaped wall stabilizes the cup in all directions when it is held by the cup support. The ring-shaped wall can be made rotationally symmetric, so that it does not matter how (in which orientation) the cup is inserted into the cup support, or how (in which orientation) the cup support is disposed in a dispensing device. The outer wall can be formed integrally with the base, e.g. by forming a bulge on outer periphery or circumference of the base.

Preferably, the at least one inner support structure comprises more than one fin-shaped element with a leading edge as the outer sidewall of the at least one fin-shaped element. Usually the cup support comprises at least 3 fin-shaped elements, preferably 5. Generally the base has a circular shape, and the fin-shaped elements are disposed radially, and preferably equally, on the first surface of the base. The radial arrangement allows multiple fin-shaped elements to form a cup holding space that resembles an interrupted ring-shaped cup holding space. A round cup with a circumferential flange at its bottom can be fitted perfectly. Further, the radial arrangement of the fin-shaped elements allows any spilled liquid to be drained towards the center of the base. At the center the liquid can be removed by a hole or the like, as shown below. The fin-shaped elements consume very little material but are nevertheless very stable. According to the preferred embodiment the tail of the fin-shaped elements curves downward to the centre of the base. The curved tail is well suited to enable the correct positioning of the cup, in particular the horizontal positioning of the cup bottom. Actually if the consumer doesn't exactly centre the cup on the cup support then the curved tails of the fin-shaped elements immediately make the cup falls so that the consumer notices that the cup is not supported. Then the consumer is forced to correctly position the cup in the cup holder: correct positioning guarantees that the cup bottom is horizontal and consequently that the cup is well positioned with the dispenser means for preparing the beverage.

Preferably, the base comprises at least one hole at its center, and the base is funnel-shaped with the funnel opening being the hole. The hole serves to remove liquid from the cup support, and can thus prevent that liquid starts to collect in the cup support and may damage the cup. The funnel-shaped base supports the drainage of liquid to the center hole. Particularly in combination with the above-mentioned radial arrangement of the fin-shaped elements, liquid can effectively be guided towards the hole in the cup support.

Preferably, the at least one inner support structure is designed such that the inner sidewall of the at least one outer support structure presents a notch. With this simple modification of the outer support structure, a further size of cup with different, but well determined diameter, can be held securely by the cup support.

Preferably, the level of the first surface of the base is higher in each cup holding space than outside of each cup holding space. The higher level in the cup holding space has the effect that the cup does not touch directly onto the first surface of the base. Therefore, any liquid that potentially might collect in the cup support does not come into contact with the cup. Thereby, damage caused by soaking the cup can be prevented. The bridge between the inner support structure and the outer support structure that causes the higher level in the cup holding space also increases the structural stability of the cup support as a whole.

Preferably, a plug element extends from a second surface of the base, wherein the second surface is opposite to the first surface of the base, and wherein the plug element comprises at least one protrusion. The plug element can be used to insert the cup support into holding means of a dispensing device, as will be explained below. The protrusion can further function to stabilize the insertion of the cup support into a dispensing device. The plug element can further be used as a drain pipe, if it is constructed to be hollow, and if its opening is connected to or is the hole in the surface of the base.

The cup support is designed to be preferably used with a specifically designed cup. The specifically designed cup has a circumferential flange at its bottom. The circumferential flange has a diameter so that it fits into at least one cup holding space of the cup support when put centered onto the cup support. The cup can thus be inserted easily and is held securely.

The present invention is further directed to a dispensing device for preparing a beverage in a cup, wherein the dispensing device comprises:
- a cup support according to one of the above embodiments,
- injection means for injecting at least one jet of a diluent into a cup placed on the cup support,
- a motor for vertically moving the cup support or the injection means.

According to the preferred embodiment, the dispensing device comprises a sensor for identifying the size of the cup placed in the cup support and the motor for vertically moving the cup support or the injection means is adapted to relatively position the cup support and the injection means according to the size of the cup.

Preferably the sensor is operable to sense the upper edge of the cup placed in the cup support. The sensor can be an optical sensor configured for sending a light beam and for receiving the beam reflected on the cup edge. If the dispenser is configured for preparing beverages in two cups of different sizes, the sensor is configured for sending two beams at two different heights corresponding to the heights of the two cups. Then the dispensing device can move the cup support or the injection means to a specific vertical position one relative to the other so that the food ingredient in the cup is dissolved by the diluent very quickly and most effectively. The beverage or food production of the dispensing device can thus be fastened and improved.

According to a preferred embodiment the dispensing device can comprise holding means for receiving the cup support, the holding means being designed to transfer vertical movement to the cup support. The holding means can also be designed to transfer horizontal movement and/or rotation movement to the cup support. By transferring the movement of the holding means to the cup support, preferably by the plug element and the protrusion, the cup support can be moved indirectly. Therefore, the cup support can be easily dismantled, and can be easily exchanged or cleaned without danger of damaging structurally important parts (which it does not require due to the indirect actuation).

Preferably, the holding means comprises a hole for receiving the plug element that extends from the second surface of the base of the cup support, and the plug element and the holding means present cooperating elements for fixing the plug element to the holding means. The cooperating elements can comprise a protrusion in the plug element and a notch in the holding means for receiving the protrusion of the plug element.

The present invention is further directed to a process for preparing a beverage with a dispensing device such as described above comprising at least the following steps:
- requesting the consumer to place a cup in the cup support,
- sensing the size of the cup placed in the cup support,
- vertically moving the cup support or the injection means to a vertical position determined by the sensed size of the cup.

In summary the cup support and the dispensing device can improve the existing state of the art, and can provide a solution wherein the cup support can be easily dismantled and cleaned, and wherein the dissolution of a food ingredient by diluent jets can be carried out most effectively.

The present invention will now be explained in more detail in relation to the attached drawings.

Figure 1:
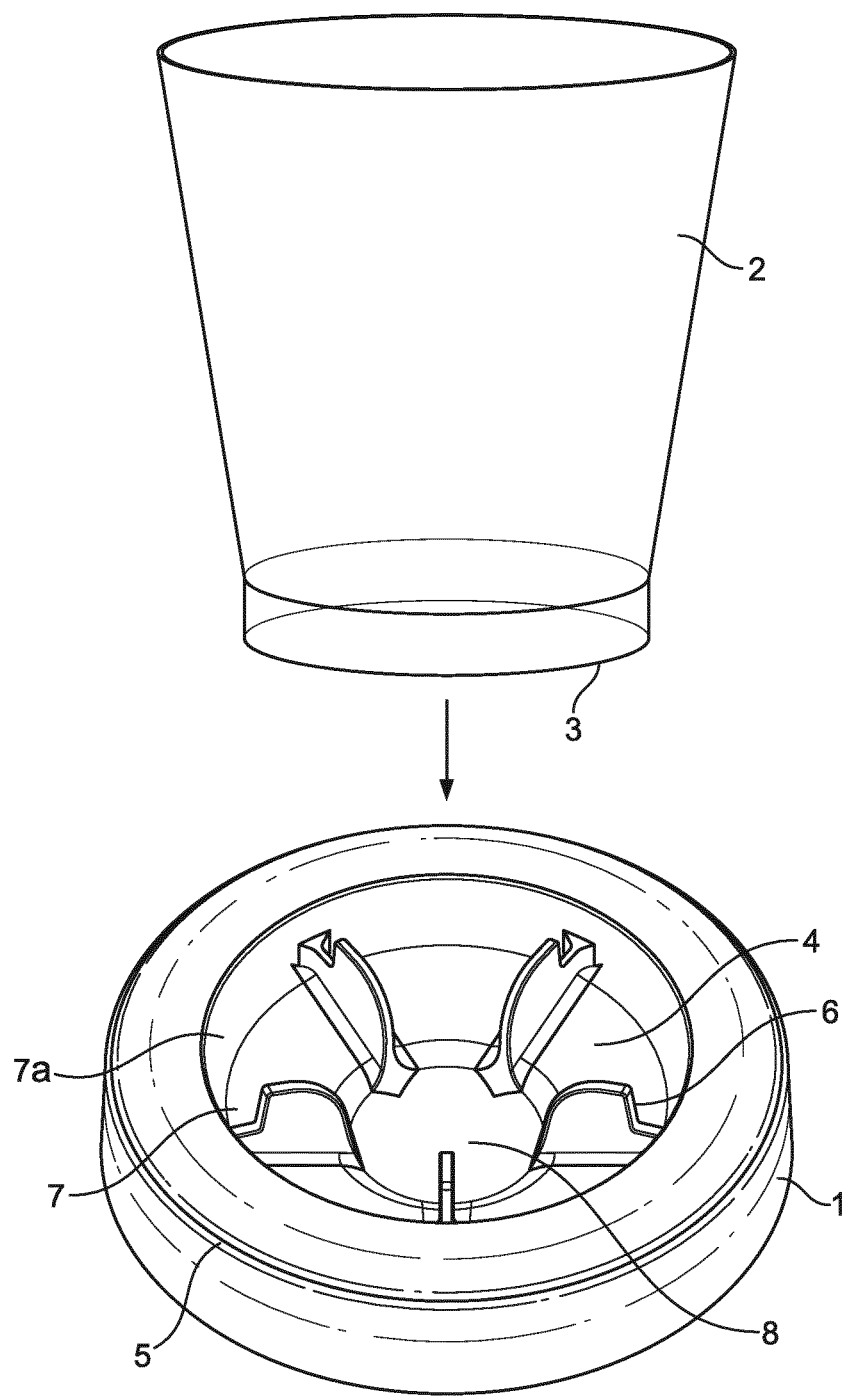
FIG. 1 shows a cup support and a cup according to the present invention.

FIG. 1 shows a cup support 1 of the present invention, into which a suitable cup 2 can be fitted. The cup support 1 can hold the cup 2 in a cup holding space 7. The cup 2 preferably has a flange 3 or a specific structure formed on its bottom, which fits into the cup holding space 7. That means the flange 3 or structure fits into the cup holding space, if the cup 2 is put centered onto the cup support 1. A circumferential flange 3 is an example, which would fit into a circular cup holding space 7. However, other structures formed on the bottom of the cup 2 that fit into a cup holding space 7 of the cup support 1 can be designed.

The cup support 1 comprises a base 4, which is adapted to hold and support a cup 2 from below. The base 4 has an upper surface, onto which the cup 2 is to be placed in a preferably centered arrangement. The base 4 thus takes the weight of the cup 2. The base 4 can have a circular structure as shown in FIG. 1, but is not limited thereto. The base 4 can have a flat upper surface, or can have an upper surface that is tilted downwards and approaches the middle of the base 4, and thus represents a kind of funnel shape.

In the middle of the base 4 a hole 8 or multiple holes 8 can be located, which can have a function to drain away liquid that collects on the upper surface of the base 4. The base 4 can have extra guiding structures or channels (not shown) that further support the drainage of the liquid. The base 4 can be coated with a liquid rejecting layer (not shown), for example a water repellant layer, in order to further support the removal of liquid, and to prevent the contamination of the first upper surface of the base 4.

The base 4 has an outer circumference or periphery, and has an inner center. Elements of the cup support 1 that are in this application referred to with the word "outer" are to be understood to be positioned closer to the periphery of the base 4 than elements that are referred to with the word "inner", which are understood to be positioned closer to the center of the base 4.

The cup support 1 further comprises at least one outer support structure 5 that is positioned on the outer periphery of the base 4. The outer support structure can for example be a ring-shaped wall 5 surrounding the base 4 as shown in FIG. 1. However, the outer support structure 5 can also be only a part of such a surrounding wall 5, the part being positioned at a certain location on the circumference or periphery of the base 4. The outer support structure must not necessarily have the shape shown in FIG. 1. The outer support structure 5 could also be a pillar or a post that is positioned at the periphery of the base 4. The outer support structure 5 is not limited in its thickness or its height, but preferably is as high as a specifically designed structure or flange 3 on the bottom of a suitable cup 2. The outer support structure 5 has to have at least one inner sidewall 5a (FIGS. 2a, 2b) facing the center of the base 4. The outer side of the outer support structure 5 can also be a wall, but can also be a slanted or curved tail. The outer support structure 5 can further have means to prevent liquid from draining over the outer edges of the cup support 1, like a collecting channel or the like. The outer support structure 5 can be fabricated integrally with the base 4. Therefore, it can for example be molded from the same plastic material as the base 4.

The cup support 1 further comprises at least one inner support structure 6. The inner support structure 6 can preferably be one fin-shaped element or a plurality of fin-shaped elements, as shown in FIG. 1. Different shapes are, however, also possible, e.g. a post- or pillar-shape. Or the inner support structure 6 can be a second ring-shaped wall that is disposed within the outer ring-shaped wall 5 or in general the outer support structure 5. The inner support structure 6 can be integrated with the base 4, and can be made of the same material, by for example molding it and the base 4 from a single plastic piece. The inner support structure 6 has at least an outer sidewall 6a (FIGS. 2a, 2b) that faces the inner sidewall 5a of the outer support structure 5.

As shown in FIG. 1, a plurality (here in particular five) fin-shaped elements can be radially disposed on a circular base 4. The fin-shaped element 6 can surround a hole 8 in the center of the base 4. The leading edges 6a of the fin-shaped elements 6 then face the outer support structure 5, which is a ring-shaped wall in FIG. 1. The tails of the fin-shaped elements 6 curve downwards to the base 4 and in direction of the hole 8 at the center of the base 4. The fin-shaped elements 6 could also be connected to each other. The fin-shaped elements 6 can be of different number, shape or size than shown in FIG. 1.

Between the at least one outer support structure 5 and the at least one inner support structure 6 at least one cup holding space 7 is formed. In particular, the cup holding space 7 is formed between the inner sidewall 5a of the outer support structure 5, and the outer sidewall 6a of the inner support structure 6. In FIG. 1 the cup holding space 7 is comprised of a plurality of cup holding spaces defined between the outer ring-shaped wall 5 and one of the plurality of fin-shaped elements 6. If the inner support structure 6 would be also designed as a second ring-shaped wall, the cup holding space 7 would be a ring-shaped cup holding space.

Figure 2A:
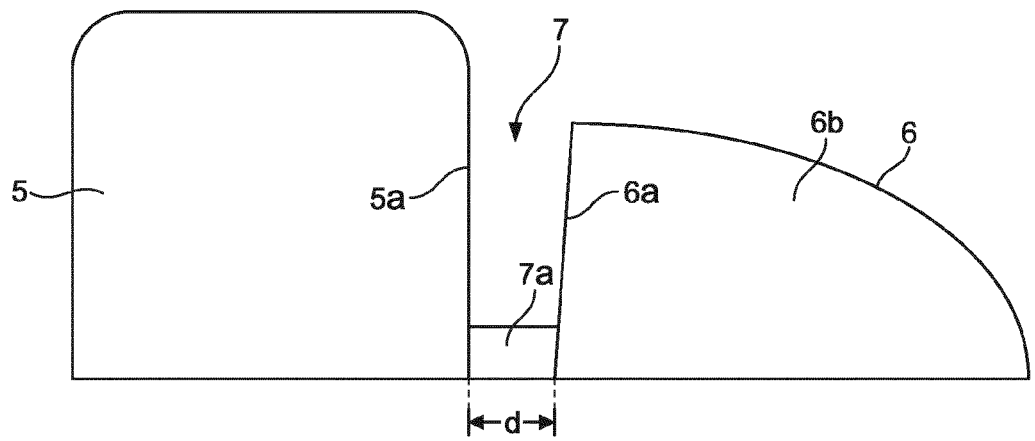
FIGS. 2a and 2a show a cup holding space defined in the cup support according to the present invention.

FIG. 2a shows further details that highlight the outer support structure 5 and the inner support structure 6. The inner sidewall 5a of the outer support structure 5 and the outer sidewall 6a of the inner support structure 6 define the cup holding space 7 between each other. For the same reason, as shown in FIG. 1, the level of the first upper surface of the base 4 in the cup holding space 7 is preferably elevated in respect to the first upper surface of the base 4 outside the cup holding space 7. In other words, a bridge, a bar or some kind of crosspiece 7a preferably connects the inner support structure 6 and the outer support structure 5. The crosspiece 7a can be integrally structured with the outer support structure 5, the inner support structure 6, the base 4 or all of the aforementioned elements. The crosspiece 7a serves the purpose that if a cup 2 is held in the cup holding space 7, any liquid that is spilled and starts to collect on the first upper surface of the base 4 is prevented from touching the cup 2. At least as long as not too much liquid collects and overflows the crosspiece 7a. Preferably the liquid is additionally drained away through a hole 8 in the center of the base 4, preferably supported by a funnel-shaped design of the base 4.

Figure 2B:
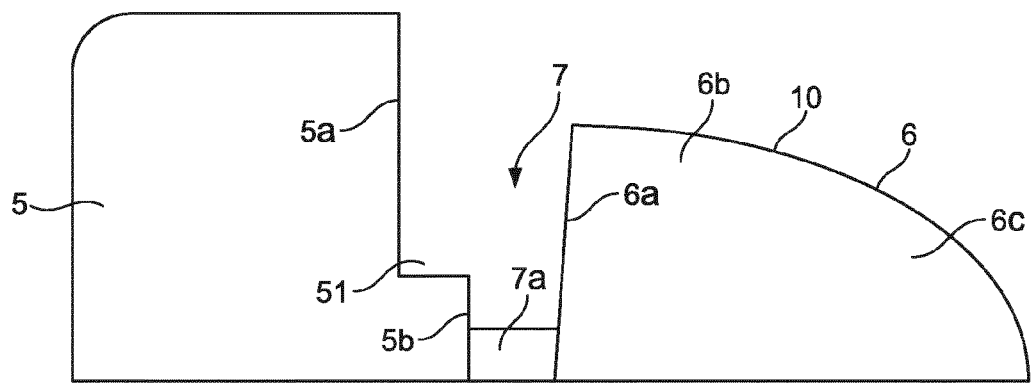
Figure 3C:
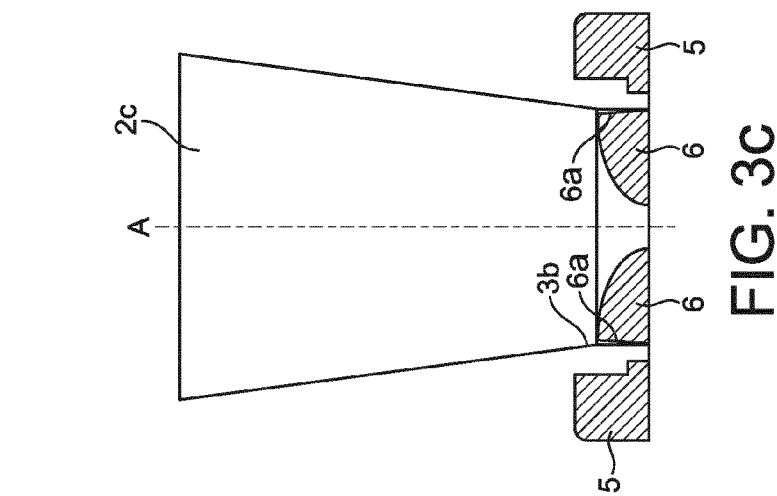
FIGS. 3a to 3c are section views showing cups of a different diameter and size held in the cup holding space of the cup support according to the present invention.
Figure 3B:
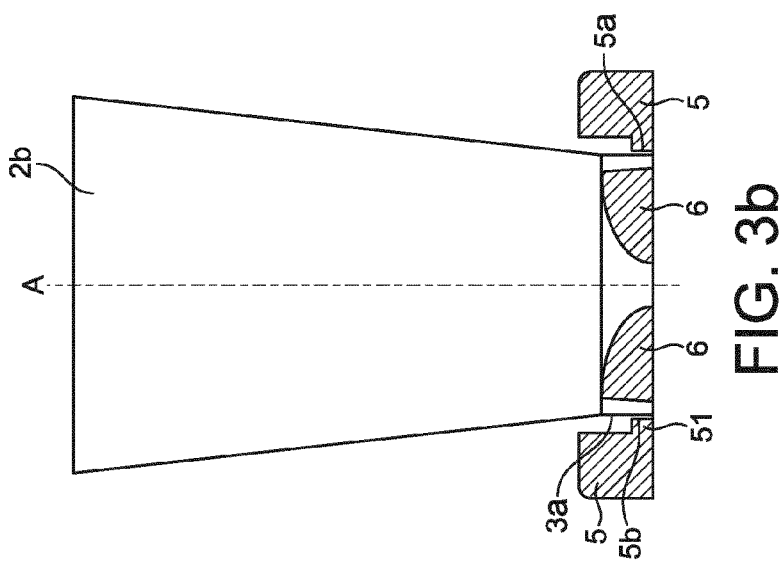
Figure 3A:
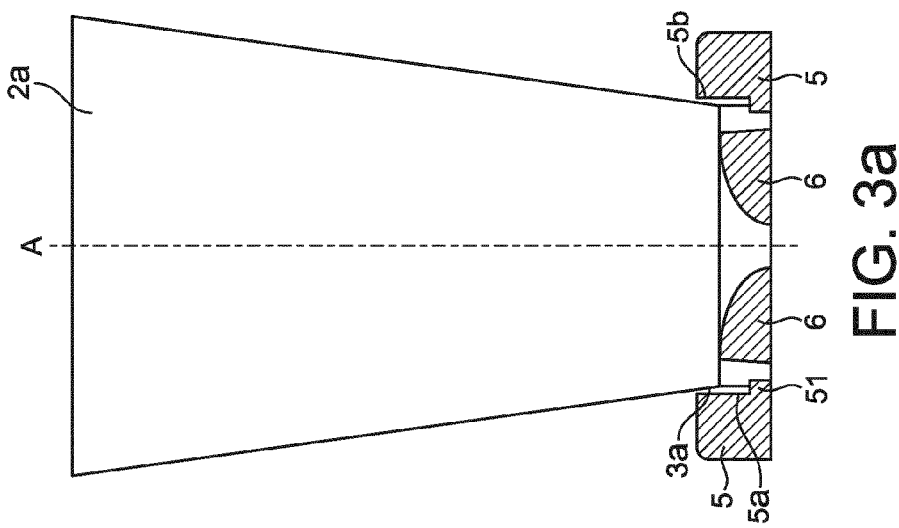

FIG. 2b shows how the outer support structure 5 presents a notch 51 in its inner wall for receiving a third size of cup. As shown in the FIGS. 3a, 3b and 3c, cups 2a, 2b, 2c of different sizes, in particular different diameters, can be held in the cup support. In FIG. 3a, the cup 2a is retained by its bottom outside wall 3a leaning onto the upper part 5a of the inner sidewall of the outer support structure 5 above the notch 51. In FIG. 3b, the cup 2b is retained by its bottom outside wall 3a leaning onto the bottom part 5b of the inner sidewall of the outer support structure 5 that is under the notch 51. In FIG. 3c the cup 2c is retained by it bottom inside wall 3b leaning onto the outer sidewall 6a of the inner support structure 6. That is, the cup support 1 is adapted to hold three different cups 2a, 2b, 2c in three cup holding positions. The cups 2a, 2b, 2c present different internal volumes for the preparation of different beverages quantities. Yet once it is well positioned, each cup is well supported on the cup support: the support can move while firmly retaining the cup whatever its size and when a diluent is injected in the cup, the cup remains centered on the cup support for an effective preparation of the beverage. The good positioning of the cup on the support is at least linked to the shape in form of fin of the elements 6 with their tails curving downwards to the centre of the base. If the customer doesn't place the cup exactly horizontally on the support, at least one fin-shaped element 6 will make the cup slide and fall.

Figure 4A:
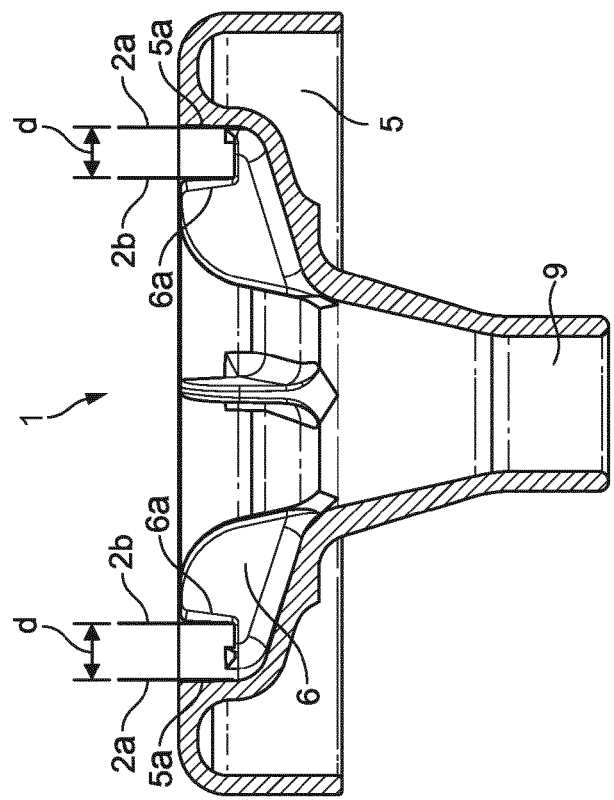
FIGS. 4a and 4b show a cup support according to the present invention.
Figure 4B:
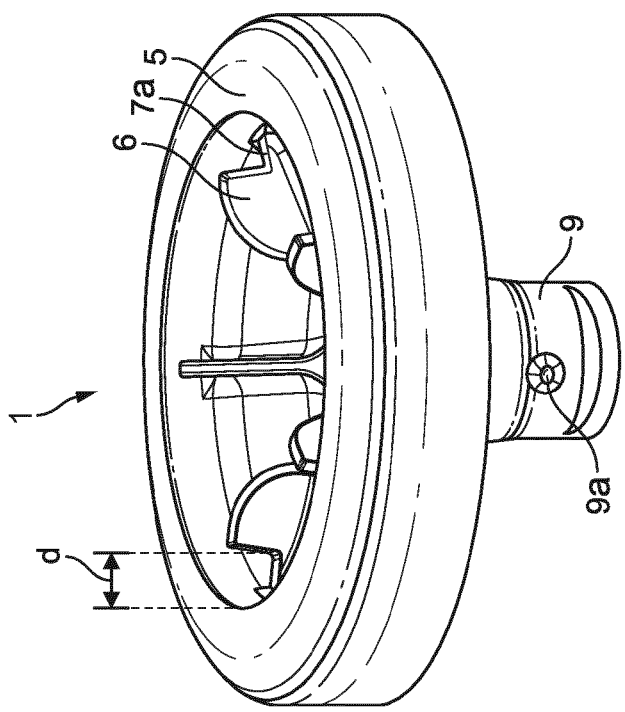
Figure 5A:
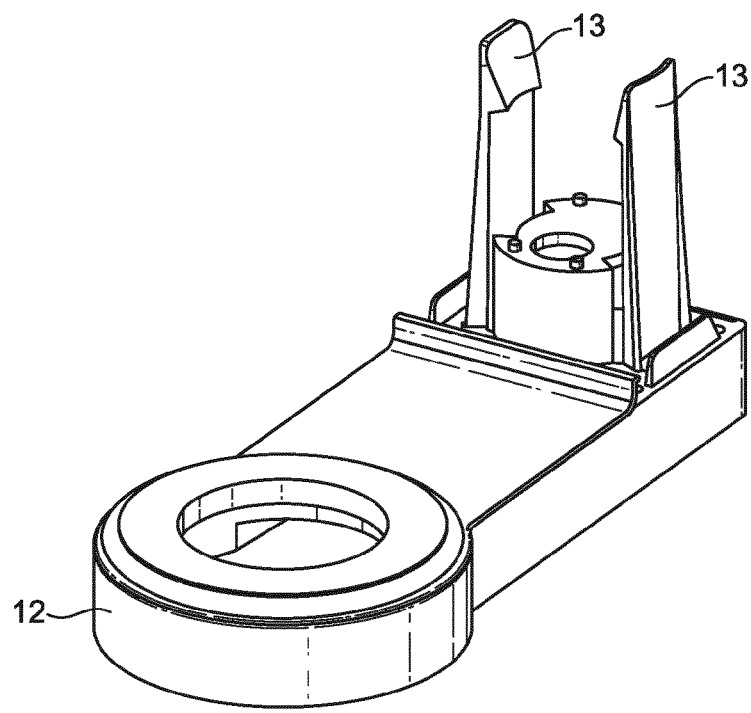
FIGS. 5a and 5b show holding means for a cup support according to the present invention.

FIG. 4a shows a further illustration of the cup support 1 of the present invention. Again the outer support structure 5 is a ring-shaped outer wall and the inner support structure 6 is comprised of a plurality of fin-shaped elements 6 that are disposed radially in respect to the ring-shaped outer wall 5. In the middle of the base 4 is provided a hole 8, which serves as a drain for liquid, and is connected to a plug element 9 that is preferably hollow and can thus be used as a drain pipe. Further, the plug element 9 is used for enabling easy plugging and easy removing of the cup support 1 into respectively from holding means 12 of a dispensing device (FIG. 5a). No tool should be necessary therefore. The plug element 9 can be fabricated integrally with the base 4. The cup support 1 can be molded integrally from a single piece of, for example, plastic, which constitutes the outer support structure 5, the inner support structure 6, the base 4, and the plug element 9. The plug element 9 preferably extends from a second lower surface of the base 4, which is opposite to the first upper surface, onto which the inner support structure 6 is disposed. The plug element 9 and the complete cup support 1 can resemble the shape of a funnel or mushroom, as shown in FIG. 4a. The plug element 9 comprises a protrusion 9a that is configured for cooperating with a hole in holding means in the dispensing machine. This cooperation guarantees to the operator that he has correctly placed the cup support in the dispenser—e.g. after cleaning—and that the cup support is well oriented (that is horizontally) for the preparation of beverages. FIG. 4b is a cross-sectional view of the cup support 1. Shown in FIG. 4b is how the bottom flange of a larger cup 2a is retained by the inner sidewall 5a of the outer support structure 5 and the bottom flange of a smaller cup 2b is retained by the outer sidewall 6a of an inner support structure 6.

Figure 5B:
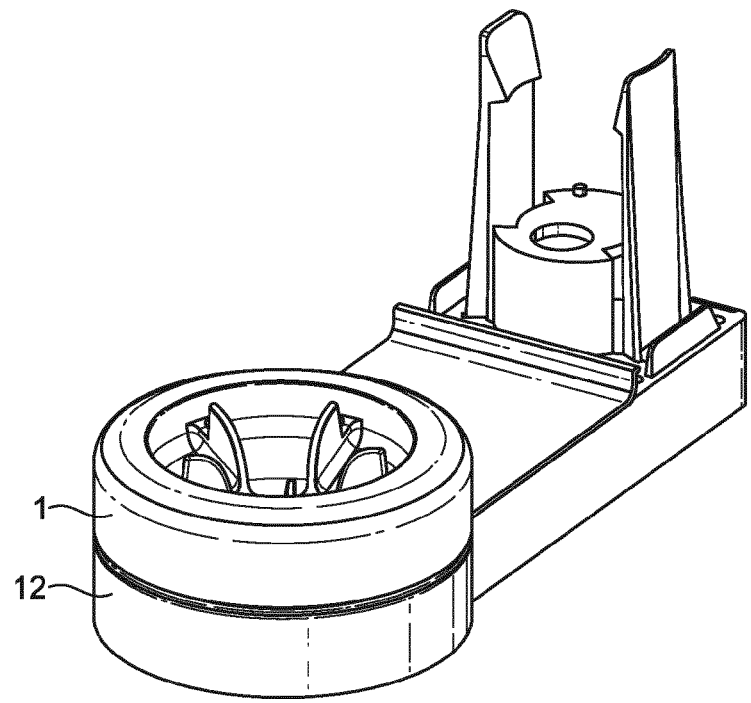

The cup support is used in a dispenser for preparing beverage which usually comprises injection means for injecting at least one jet of a diluent in the cup. Since the dispensing device has to move the cup support 1 at least to a position where the diluent is injected into the cup 2, it has to comprise means to at least vertically move the cup support 1. To this end the dispensing device can comprise a holding means 12 as shown in the FIGS. 5a and 5b. The holding means 12 is provided to receive the cup support 1. Preferably, the holding means 12 has an opening, like a circular hole, into which the plug element 9 of the cup support 1 can be fitted. An optional protrusion 9a on the plug element 9 can be fitted into an optional recess of the holding means 12, so that the holding means 12 is firmly placed in the holding means and the latter can transfer all types of movement to the cup support 1. This cooperation between the both elements also guarantees that the bottom of the cup is well horizontally placed on the cup support. A part 13 of the holding means is usually configured for attachment to the dispenser. The holding means 12 can be removable from the dispensing device 10, but can also be fixed to the dispensing device 10. The cup support 1 can be easily taken out of the holding means 12 so that it can be cleaned or exchanged.

Figure 6A:
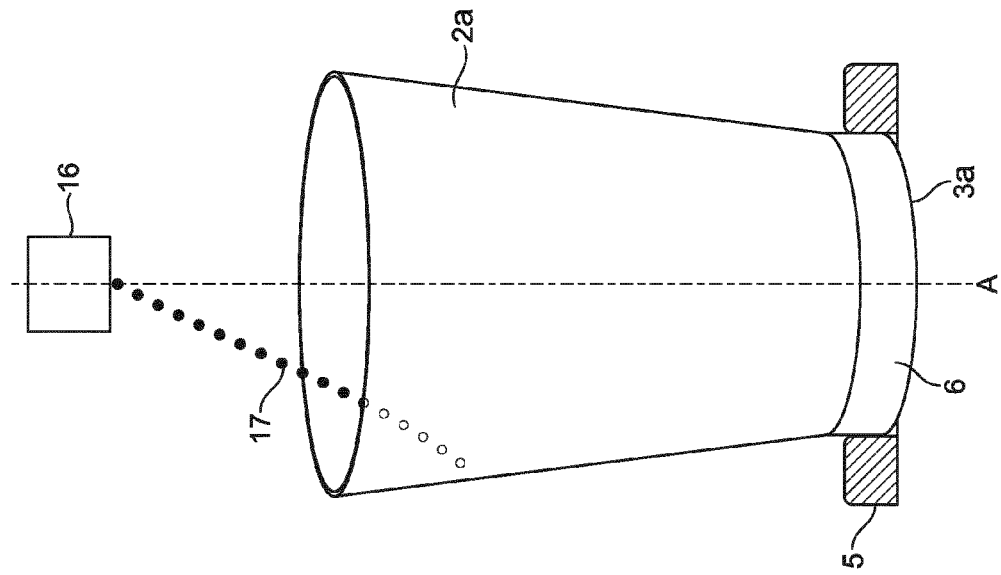
FIGS. 6a, 6b, 7a, 7b show sensor means and jets of diluent injected into differently sized cups held in the cup support according to the present invention.
Figure 6B:
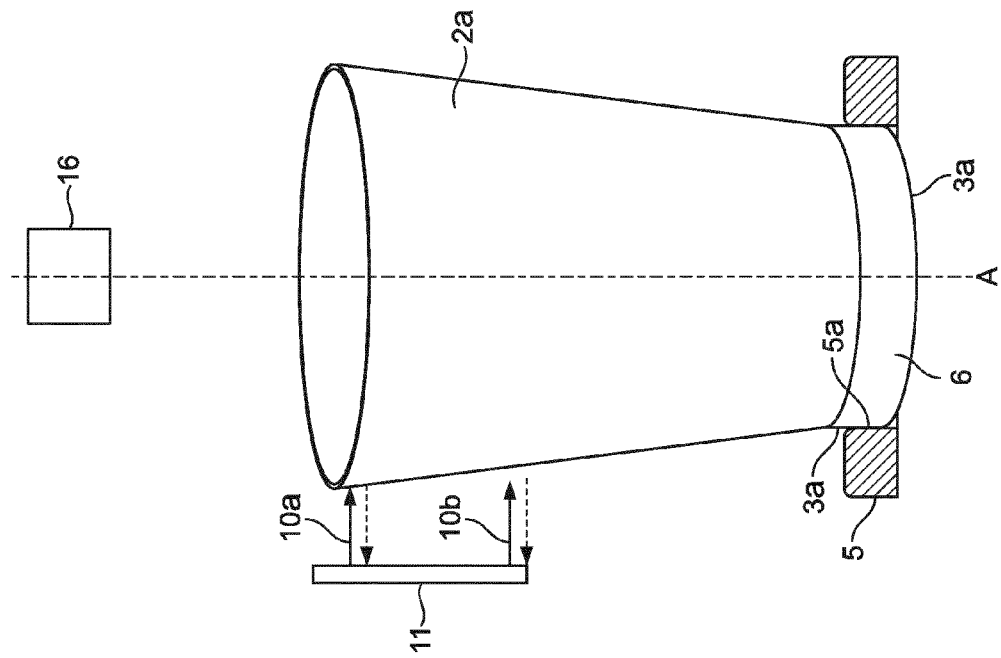
Figure 7B:
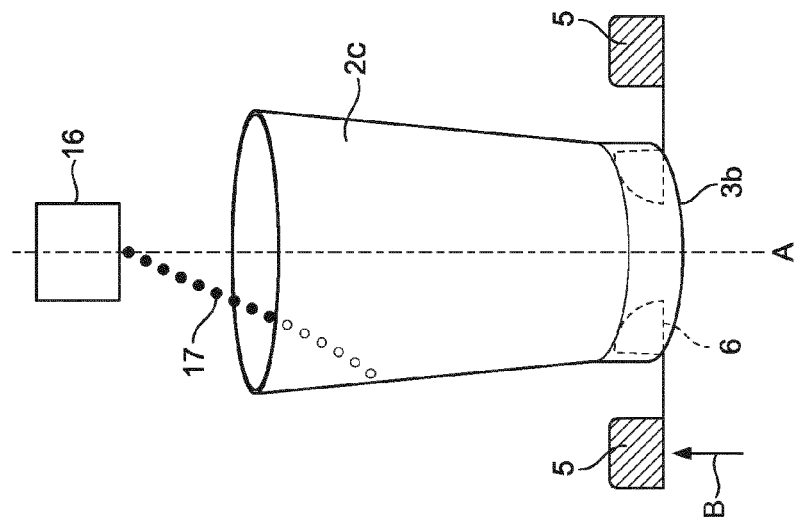
Figure 7A:
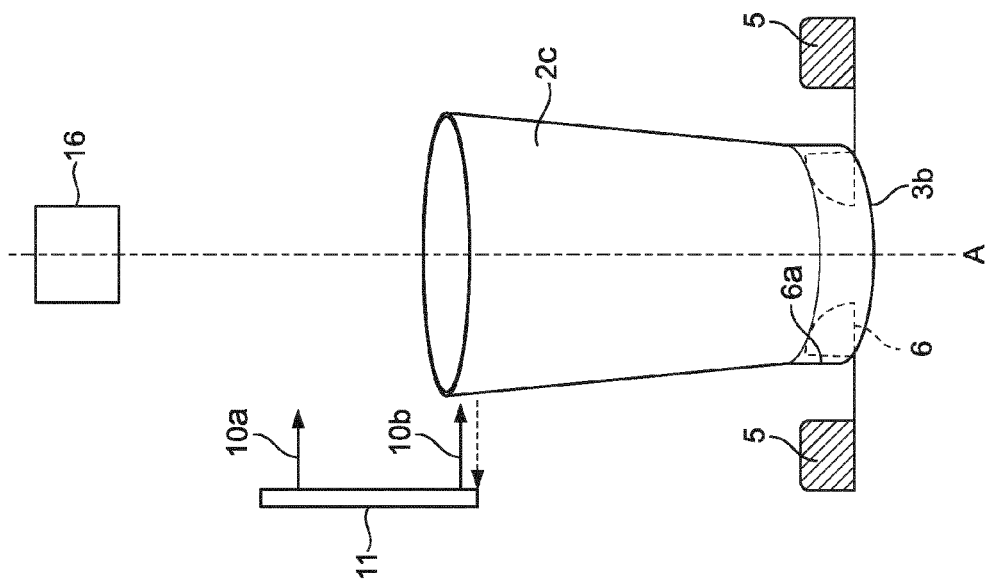

FIGS. 6a and 6b illustrate the processing of placing a cup and preparing a beverage with a dispenser of the present invention using a big size cup 2a. The cup 2a is placed on the cup support and the outside wall 3a of its bottom flange leans on the inner sidewall 5a of the outer support structure 5. Once the cup is placed in the cup support, a sensor 11 analyses the size of the cup. In the illustrated figures, the sensor sends two optical beams 10a, 10b at two different heights corresponding to the height of each cup that can be used with the dispenser: that is a beam 10a at a height corresponding to the height of the big cups and a beam 10b at a height corresponding to the height of the small cups. The sensor 11 analyses the reflected beams corresponding to the emitted beams 10a and 10b on the cup wall. In FIG. 6a the sensor analyses that the cup is a big size cup because the both beams are reflected by the cup wall and in particular the higher 10a. Then according to FIG. 6b the dispenser initiates the preparation of a beverage for a big size cup: e.g. a specific big amount of beverage powder is introduced in the cup and then at least one diluent jet is introduced in the cup. FIGS. 7a and 7b illustrate the processing of placing a cup and preparing a beverage with a dispenser of the present invention using a small size cup 2c. The cup 2c is placed on the cup support and its bottom flange leans on the outer sidewall 6a of the inner support structure 6 of the cup support. Once the cup is placed in the cup support, the sensor 11 analyses the size of the cup by sending the two optical beams 10a, 10b at their different heights and analyzing the reflected beams on the cup wall. In FIG. 7a the sensor analyses that the cup is a small size cup because only the lower beam is reflected by the cup wall. Then according to FIG. 7b the dispenser initiates the preparation of a beverage for a small size cup: e.g. a specific small amount of beverage powder is introduced in the cup. Then, but before a diluent jet is introduced in the cup, the dispenser moves up the cup support 1—as indicated by the arrow B—so that the cup 2c is positioned nearer from the injection means and so that the diluent jet 17 can hit the cup sidewall according to the angle enabling the most effective dissolution such as for the big cup 2a. The dispensing device comprises a motor for vertically moving the holding means.

Usually the dispensing device is tuned for delivering beverages in a specific set of cups differing by their bottom diameters and their height, the larger diameter, the higher the cup height. Consequently the sensor can identify the volume of beverage to produce by the height sensed by the sensor and the position of the cup relative to the injection means can be set for an optimal dissolution.

In the above embodiment, the sensor is an optical beam yet any other sensor able to detect the upper edge of the cup could be used.

Moreover, although FIGS. 6a, 6b, 7a and 7b illustrate a sensor 11 detecting two sizes of cup, the dispenser of the invention can also detect three sizes of cups. In that alternative, the sensor comprises three optical beams positioned at three different heights each corresponding to the height of one of the three cups that can be used with the dispenser. The sensor beams are positioned to evaluate the height of the cup when the cup is placed in the dispenser by the customer the cup support being at rest.

According to a preferred embodiment, the injection means 16 deliver at least 4 diluent jets each of them impacting onto a defined position of the sidewall of the cup 2 and the cup 2 is rotated around its symmetry axis A during the injection of the jets, so that a most effective dissolution of the food ingredient in the cup 2 can occur. Preferably at least 4 diluent jets impact the cup sidewall according to the process described in WO 2010/034722.

The dispensing device can comprise a plurality of ingredient containers under or to which a cup 2 held in the cup support 1 can be moved. Then the food ingredient can be released or dosed into the cup 2. To move the cup under the ingredient containers, the dispensing device can comprise a motor for horizontally moving the holding means. However, the food ingredient can also be in the cup 2 beforehand, and only a diluent needs to be added to the cup 2. The dispensing device 10 then does not necessarily require food ingredient containers.

The different movements of the cup support 1 can be implemented by motors for vertical, horizontal or rotational movement connected to the holding means 12. Usually belts or gears can transfer the rotation of the motor shafts in rotational or linear movements of the holding means. The motor(s) of the dispenser can be conventional motors that are electrically or mechanically activated, e.g. electro-motors.

The invention presents the advantage of proposing a cup support of simple mechanical structure that can be easily dismantled from the dispensing device for cleaning purposes.

Another advantage is that the cup support can support different cups of different diameters and sizes and secure them during the movement of the cup support.

Another advantage is that the dispensing device can guarantee that at least one diluent jet provided by injecting means is correctly oriented whatever the size of the cup such that it impacts a predetermined position on e.g. a sidewall of the cup. The correct orientation of the jet achieves an effective dissolution of food ingredient in the cup.

The invention claimed is:

1. A cup support for holding a cup in a dispensing device, the cup support comprising:
   a base;
   at least one outer support structure on an outer periphery of the base;
   at least one inner support structure arranged on a first surface of the base within the outer periphery of the base; and
   the at least one cup holding space is formed between an inner sidewall of the at least one outer support structure and an outer sidewall of the at least one inner support structure,
   wherein the at least one inner support structure is at least one fin-shaped element with a leading edge as the outer sidewall of the at least one fin-shaped elements, and a tail of the at least one fin-shaped element curves downward to a center of the base.

2. Cup support according to claim 1, wherein the at least one outer support structure is a ring-shaped wall surrounding the base.

3. Cup support according to claim 1, comprising at least 3 fin-shaped elements.

4. Cup support according to claim 1, wherein the base has a circular shape, and wherein the at least one fin-shaped element is located radially on the first surface of the base.

5. Cup support according to claim 1, wherein the base comprises at least one hole at its center, and the base is funnel-shaped with the funnel opening being the hole.

6. Cup support according to claim 1, wherein the inner sidewall of the at least one outer support structure comprises a notch.

7. Cup Support according to claim 1 comprising a plug element extending from a second surface of the base, the second surface is opposite to the first surface of the base and the plug element comprises at least one protrusion.

8. A dispensing device for preparing a beverage in a cup, the dispensing device comprising:
   a cup support comprising:
   a base;
   at least one outer support structure on an outer periphery of the base;
   at least one inner support structure arranged on a first surface of the base within the outer periphery of the base; and
   the at least one cup holding space is formed between an inner sidewall of the at least one outer support structure and an outer sidewall of the at least one inner support structure,
   wherein the at least one inner support structure is at least one fin-shaped element with a leading edge as the outer sidewall of the at least one fin-shaped elements, and a tail of the at least one fin-shaped element curves downward to a center of the base;
   an injection member for injecting at least one jet of a diluent into a cup placed on the cup support; and
   a motor for vertically moving the cup support or the injection member.

9. Dispensing device according to claim 8 comprising a sensor for identifying the size of cup placed in the cup support and the motor for vertically moving the cup support or the injection member is adapted to relatively position the cup support and the injection member according to the size of the cup.

10. Dispensing device according to claim 8 comprising a holder for receiving the cup support, the holder is designed to transfer vertical movement to the cup support.

11. Dispensing device according to claim 10, wherein the holder comprises a hole for receiving a plug element that extends from the second surface of the base of the cup support, and the plug element and the holder present cooperating elements for fixing the plug element to the cup support.

12. Dispensing device according to claim 11 wherein the cooperating elements comprise a protrusion in the plug element and a notch in the holder for receiving the protrusion of the plug element.

13. A process for preparing a beverage with a dispensing device in a cup, wherein the dispensing device comprises a cup support comprising: a base; at least one outer support structure on an outer periphery of the base; at least one inner support structure arranged on a first surface of the base within the outer periphery of the base; and the at least one cup holding space is formed between an inner sidewall of the at least one outer support structure and an outer sidewall of the at least one inner support structure; wherein the at least one inner support structure is at least one fin-shaped element with a leading edge as the outer sidewall of the at least one fin-shaped elements, and a tail of the at least one fin-shaped element curves downward to a center of the base; an injection member for injecting at least one jet of a diluent into a cup placed on the cup support; and a motor for vertically moving the cup support or the injection member, the process comprising:
   requesting the consumer to place a cup in the cup support;
   sensing the size of the cup placed in the cup support;

vertically moving the cup support or the injection member to a vertical position determined by the sensed size of the cup.

* * * * *